US012605851B2

(12) United States Patent
Alspach et al.

(10) Patent No.: US 12,605,851 B2
(45) Date of Patent: Apr. 21, 2026

(54) ROBOT END EFFECTOR

(71) Applicant: TOYOTA RESEARCH INSTITUTE, INC., Los Altos, CA (US)

(72) Inventors: Alexander Alspach, Woburn, MA (US); Andrew M. Beaulieu, Somerville, MA (US); Brendan Hathaway, Newton, MA (US); Naveen Suresh Kuppuswamy, Arlington, MA (US); Aimee S. Goncalves, Kingston, MA (US)

(73) Assignee: TOYOTA RESEARCH INSTITUTE, INC., Los Altos, CA (US)

( * ) Notice: Subject to any disclaimer, the term of this patent is extended or adjusted under 35 U.S.C. 154(b) by 1080 days.

(21) Appl. No.: 17/689,211

(22) Filed: Mar. 8, 2022

(65) Prior Publication Data

US 2023/0139968 A1    May 4, 2023

Related U.S. Application Data

(60) Provisional application No. 63/274,136, filed on Nov. 1, 2021.

(51) Int. Cl.
B25J 15/00        (2006.01)
B25J 9/10         (2006.01)
B25J 19/02        (2006.01)
(52) U.S. Cl.
CPC ........... B25J 15/0028 (2013.01); B25J 9/106 (2013.01); B25J 15/0033 (2013.01); B25J 19/023 (2013.01)

(58) Field of Classification Search
CPC ................ B25J 15/0028; B25J 15/0033; B25J 15/0009; B25J 15/12; B25J 9/106; B25J 9/0012; B25J 19/023
See application file for complete search history.

(56) References Cited

U.S. PATENT DOCUMENTS

| | | | | |
|---|---|---|---|---|
| 4,986,723 A * | 1/1991 | Maeda | ................ | B25J 15/0009 623/64 |
| 8,231,158 B2 * | 7/2012 | Dollar | ..................... | B25J 15/12 294/111 |
| 8,833,826 B2 * | 9/2014 | Garcia | ................ | B25J 15/0009 294/111 |

(Continued)

FOREIGN PATENT DOCUMENTS

| | | |
|---|---|---|
| CN | 106881725 A | 6/2017 |
| CN | 208962034 U | 6/2019 |
| DE | 10 2019 107 975 B3 | 8/2020 |

OTHER PUBLICATIONS

Steve Crowe; "Tri Shares Design of Soft Bubble Gripper to Advance Technology"; May 26, 2021; 2 pgs .; (https://www.therobotreport.com/tri-shares-design-soft-bubble-gripper-advance-technology/).

*Primary Examiner* — Stephen A Vu
(74) *Attorney, Agent, or Firm* — Dinsmore & Shohl LLP

(57)        ABSTRACT
A robot end effector is contemplated. The robot end effector comprises a first deformable gripper, a second deformable gripper coupled to the first deformable gripper by a linkage, and an actuator coupled to the linkage and operable to move at least one of the first deformable gripper and the second deformable gripper to a position defining an angle between the first deformable gripper and the second deformable gripper that is greater than or equal to 130 degrees.

19 Claims, 7 Drawing Sheets

(56)          References Cited

U.S. PATENT DOCUMENTS

| | | | |
|---|---|---|---|
| 8,833,827 B2 * | 9/2014 | Ciocarlie ................. | B25J 15/08 |
| | | | 294/111 |
| 9,016,742 B2 * | 4/2015 | Nammoto ............... | B29C 65/70 |
| | | | 901/34 |
| 9,533,419 B1 * | 1/2017 | Strauss ................ | B25J 15/0009 |
| 9,539,728 B2 * | 1/2017 | Nammoto ............ | B25J 15/0009 |
| 9,914,214 B1 | 3/2018 | Strauss et al. | |
| 2019/0308331 A1 | 10/2019 | Hurwit et al. | |
| 2021/0252721 A1 | 8/2021 | Alspach et al. | |

* cited by examiner

ROBOT END EFFECTOR

CROSS-REFERENCE TO RELATED APPLICATIONS

This application claims the benefit of U.S. Provisional Application 63/274,136, filed Nov. 1, 2021, which is incorporated by reference in its entirety.

TECHNICAL FIELD

The embodiments described herein generally relate to robot end effectors and, more particularly, robot end effectors that include deformable grippers that are movable such that an angle greater than or equal to these grippers define an angle between the deformable grippers that is equal to or greater than 130 degrees.

BACKGROUND

Conventional robots include object grasping and manipulating members that are utilized to interact with and grasp different types of objects in a domestic environment. For example, these robots may help elderly and physically disabled people perform various tasks in their homes such as, e.g., pick up, move, and place objects in various locations within their homes. These robots suffer, however, from numerous deficiencies. In particular, these robots lack object grasping and manipulating members that are capable of grasping and moving objects of varying sizes and dimensions, namely objects having dimensions that are larger than the dimensions of the robots. Additionally, the grasping and manipulating members may not possess the ability to rotate objects around a pivot that is located as part of or on the manipulating members. The manipulating members of conventional robots may also lack friction based contact surfaces operating in conjunction with certain mechanical components that serve as environmental constraints for ensuring that objects that are picked up do not slip from the grasp of the manipulating members. It is further noted that conventional robots may lacking pressure sensing capabilities and depth cameras such as, e.g., a time-of-flight camera.

Accordingly, a need exists for robots having grasping members that enable these robots to firmly grasp and move objects of varying dimensions, including objects that are disproportionately larger than the robots, from one location to another while ensuring that these objects do not slip and fall.

SUMMARY

In one embodiment, a robot end effector is provided. The robot end effector comprises a first deformable gripper, a second deformable gripper coupled to the first deformable gripper by a linkage, and an actuator coupled to the linkage and operable to move at least one of the first deformable gripper and the second deformable gripper to a position defining an angle between the first deformable gripper and the second deformable gripper that is greater than or equal to 130 degrees.

In another embodiment, another robot end effector is provided. The robot end effector comprises a first deformable gripper, a second deformable gripper coupled to the first deformable gripper by a linkage, and an actuator coupled to the linkage and operable to move at least one of the first deformable gripper and the second deformable gripper to: a fully open defining an angle between the first deformable gripper and the second deformable gripper that is greater than or equal to 130 degrees, and a half open position defining an additional angle between the first deformable gripper and the second deformable gripper that is approximately 90 degrees.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Figure 1:
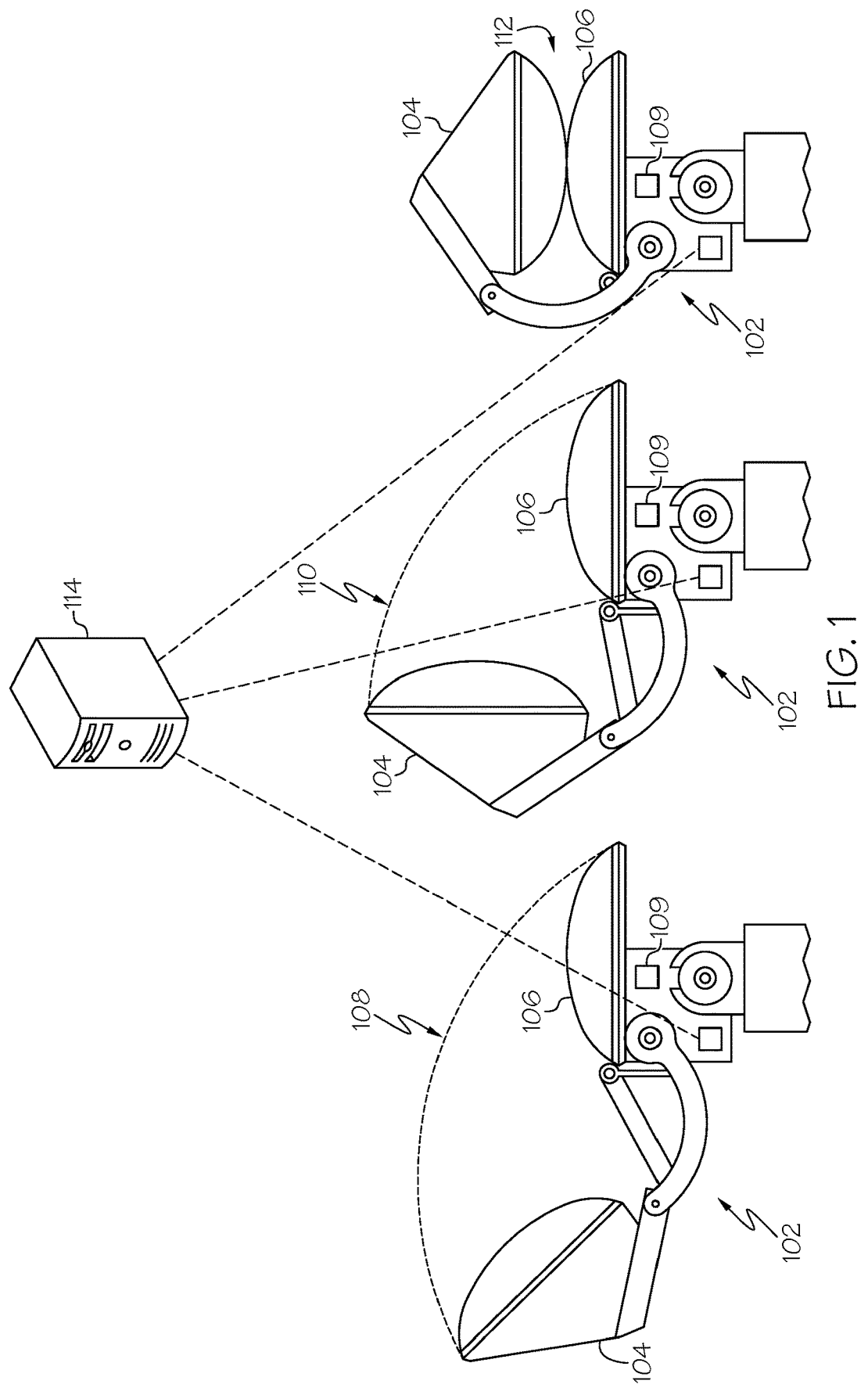
FIG. 1 depicts an example implementation of a robot end effector according to one or more embodiments described and illustrated herein.

As stated above, conventional robots may include object grasping and object manipulating members that are utilized to move objects within an environment, e.g., an apartment, a home, etc. However, these members may suffer from numerous deficiencies, namely the inability to grasp and move objects having dimensions that are larger than the dimensions of the robots themselves. Conventional robots may also lack contact surfaces having a significant amount of friction, in particular, friction that enables these surfaces to maintain a grasp on objects that is strong enough to prevent these objects from slipping and falling. Additionally, as stated, the grasping and manipulating members of these robots may not have the ability to rotate objects around a pivot, e.g., a rotational movement that is similar to the movement of a wrist.

The robot end effectors as described in the present disclosure address and overcome these deficiencies. In particular, the robot end effectors of the present disclosure includes deformable grippers that may be moved relative to each other such that an angle that is equal to or greater than one hundred and thirty degrees may be formed between the deformable grippers. Additionally, each of the deformable grippers include a base member and a deformable member having a contact surface formed of latex, which provides friction that enables the deformable grippers to firmly grasp various objects and maintain the grasp on these objects such that these objects do not slip. Configuring the robot end effector at an angle that is greater than ninety degrees when combined with a latex surface of the gripper, enables the robot end effector to firmly grasp objects, including those having dimensions that are larger than the dimensions of the robot end effector. It is further noted that robot end effector may include pressure sensors that calculate pressure data exerted at the point of contact with various external objects, which may be utilized to ensure that the pressure exerted by the deformable grippers does not bend, break, or otherwise damage the external objects contacting the deformable grippers.

It is also noted that that deformable member that is comprised of latex (or another comparable material) may have a degree of compressibility or softness that makes the robot end effector conducive for interaction directly with humans or with various objects in or near the presence of humans. In embodiments, the robot end effector of the present disclosure may also include an active pressure control feature that enables the robot end effector to traverse areas within a domestic environment that are particularly cluttered and pick up and manipulate items with a higher degree of precision as compared to conventional robots.

These deformable grippers may also be configured to perform a rotation action while grasping external objects such that the rotation action is similar to a wrist action performed by a human being. Such a rotational action may enable the deformable grippers to access gaps between walls in a domestic environment, areas around corners, and other such locations where a robot may not be able to travel and access.

Figure 2:
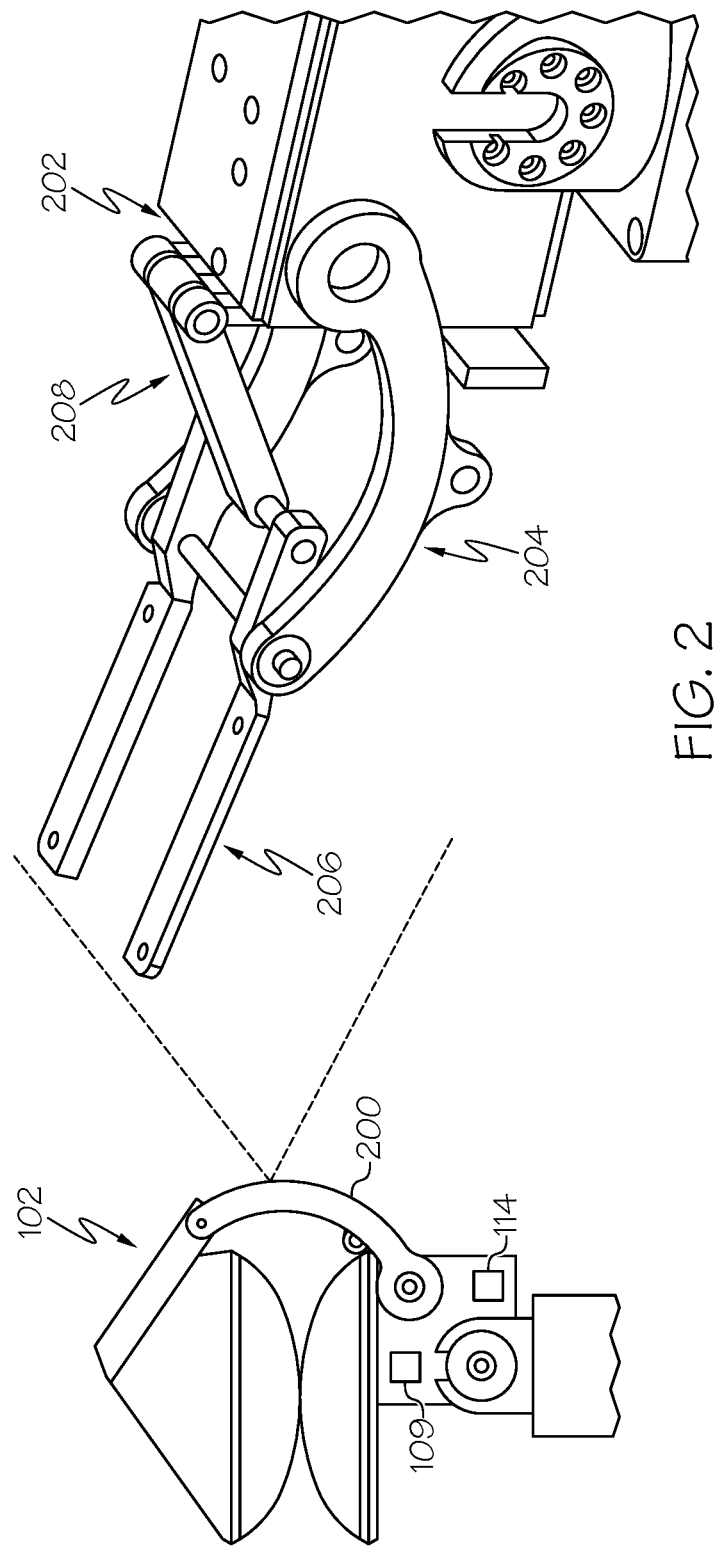
FIG. 2 depicts a detailed illustration of various parts of the linkage of the robot end effector, according to one or more embodiments described and illustrated herein.

FIG. 1 depicts an example implementation of a robot end effector as described in the present disclosure. In particular, FIG. 1 depicts the robot end effector 102, which may include a controller 114 (e.g., a computing device) and an actuator 109. The actuator 109 may be a motor such as, e.g., a Dynamixel XM540-W270-R motor. The controller 114 may provide instructions to the actuator 109, based on which the actuator 109 may operate to move the first deformable gripper 104 relative to a second deformable gripper 106 to various positions such that an angle defined between the first deformable gripper 104 and the second deformable gripper 106 may range from approximately 133 degrees to 1 degree. It is noted that the second deformable gripper 106 may be coupled to the first deformable gripper 104 by a linkage, which is illustrated in FIG. 2 and described in greater detail later on in this disclosure.

It is noted that deformability of the first deformable gripper 104 and the second deformable gripper 106 may refer, for example, to ease of deformation of deformable portions of the robotic system, e.g., ease of deformation of deformable sensors. Deformability may also refer to how easily a portion of the robot end effector contracts when contacting an object. A deformable sensor may be positioned within each of the deformable grippers and may be a camera or comparable sensor that is capable of high spatial resolution. The deformable sensor positioned within each of the deformable grippers may be a dense tensile sensing sensor that provides the robot with a fine sense of touch, e.g., comparable to the touch associated with a human's fingers. The deformable sensor may also have a depth resolution for measuring movement towards and away from the sensor.

In embodiments, each of the first deformable gripper 104 and the second deformable gripper 106 may comprise two distinct components—a base member and a deformable member. In embodiments, both of the first deformable gripper 104 and the second deformable gripper 106 may be connected to pneumatic tubes that are disposed within various parts of the robot end effector 102. These tubes may be configured to detect changes in pressure values of the first deformable gripper 104 and the second deformable gripper 106 based on various objects contacting the deformable members of these deformable grippers. A plurality of pressure sensors may be disposed within the first deformable gripper 104 and the second deformable gripper 106. As a non-limiting example, these sensors may be configured to measure pressure values ranging from, e.g., 0 to 172.37 kPa. Additionally, each of the deformable members of the first deformable gripper 104 and the second deformable gripper 106 can also geometry or pose of an object that contacts the sensor.

In embodiments, as a non-limiting example, the base member of the first deformable gripper 104 and the second deformable gripper 106 may be formed of acrylic and the deformable member of the grippers may be comprised of latex. In embodiments, the surface of the deformable members in each of the first deformable gripper 104 and the second deformable gripper 106 may be embedded with a pattern. Additionally, in embodiments, the deformable member may be attached or adhered to the base member and a depth camera may be disposed or positioned on the surface of the base member such that the depth camera is positioned to capture images of one or more external objects that contact the outer surface of the deformable member. It is noted that each of the first deformable gripper 104 and the second deformable gripper 106 may include a depth camera. In embodiments, the depth cameras, upon receiving instructions from the controller 114, may capture images, in real time, of one or more external objects that contact the outer surfaces of the these members. These images may also be utilized by the controller 114, individually or in combination with one or more computing devices external to the robot end effector 102, to determine the precise location on the outer surfaces of the deformable grippers on which the external objects contact, which may help reduce the instances of these objects slipping from the grasp of the deformable grippers.

In particular, in embodiments, upon external objects contacting the outer surfaces of the deformable surface members, the depth cameras of each of these grippers may capture images of the interior portions of the deformable surface members. In particular, the depth cameras may capture images of deformations of the deformable surface members based on contact from the external objects. These deformations correspond to changes in depth levels of the surface members, which may be detectable in the images captured by the depth cameras. Additionally, these images may also illustrate or indicate changes in depth levels associated with the patterns. Based on the changes in depth levels and the changes in the patterns, the controller 114, operating independently or in combination with one or more external computing devices, may determine various characteristics specific to the external objects, e.g., a geometric shape of these external objects, a position or orientation of these external objects relative to the first deformable gripper 104 and the second deformable gripper 106, and so forth.

In embodiments, as stated above, the first deformable gripper 104 and the second deformable gripper 106 may be oriented in a plurality of positions—a fully-open position 108, a half-open position 110, a closed position 112. In embodiments, the fully-open position 108 defines an angle between the first deformable gripper 104 and the second deformable gripper 106 that is approximately 133 degrees, while the half-open position 110 defines an angle between the first deformable gripper 104 and the second deformable gripper 106 that is approximately 90 degrees. It is noted, however, that the angle defining the fully open position may vary in that the angle may higher or lower than 133 degrees. A variety or other angle values are also contemplated.

The closed position 112 corresponds to an angle between the first deformable gripper 104 and the second deformable gripper 106 that is approximately 2-10 degrees. In embodiments, the actuator 109 may be provided with instructions from the controller 114 such that the actuator 109 may operate to move the first deformable gripper 104 relative to the second deformable gripper 106, e.g., at any angle between approximately 0 degrees to 130 degrees. In embodiments, it is noted that actuator 109 may be a high torque motor that enables the first deformable gripper 104 and the second deformable gripper 106 to achieve strong grasps around various objects. Additionally, in embodiments, idler horns may be installed in association with motors to ensure that loads are adequately supported.

FIG. 2 depicts a detailed illustration of various parts of the linkage 200 of the robot end effector 102, according to one or more embodiments described and illustrated herein. In embodiments, the linkage 200 of the robot end effector 102 may include four components, namely a fixed link component 202, a plurality of movable link components 204, 206, 208, and a plurality of revolving joints. In embodiments, it is noted that the four components of the linkage 200 may be composed of chopped carbon-filled nylon, a composite of Onxy material and embedded continuous fiberglass, or other comparable materials. Additionally, in embodiments, the linkage 200 may be 3D printed, and brass heat-set inserts may be utilized to fasten various components of the linkage 200. In embodiments, for ensuring frictionless movement of the first deformable gripper 104 and the second deformable gripper 106, plastic bushings may be positioned in association with the first deformable gripper 104, the second deformable gripper 106, and various locations of the robot end effector 102. In embodiments, the plastic bushings may be paired with or used in association with aluminum shafts in order to design the linkage 200 to be both lightweight and strong.

In embodiments, a shaft between the movable link component 204 and the movable link component 206 is maintained in a particular position by retaining ring components and similar shafts are also maintained in place via plastic spacers that are utilized to occupy empty space along axle lengths included as part of the robot end effector 102. In embodiments, the linkage 200 is less likely to bend or fracture as compared with conventional mechanical components that are similar to the linkage 200, as the linkage 200 may be composed of aluminum alloys. These alloys also have the added advantage of being only marginally heavier than various plastic components that are more susceptible to fracture.

Figure 3A:
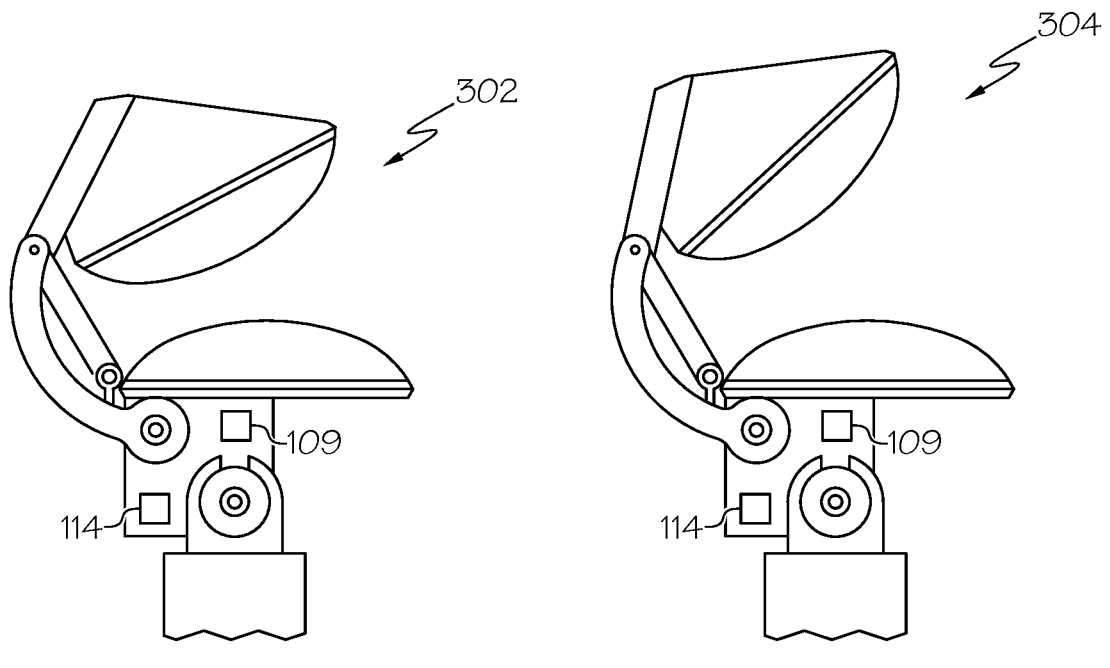
FIG. 3A depicts an example implementation of the robot end effector in which the first deformable gripper and the second deformable gripper of the effector are positioned at various acute angles, according to one or more embodiments described and illustrated herein.
Figure 3A:
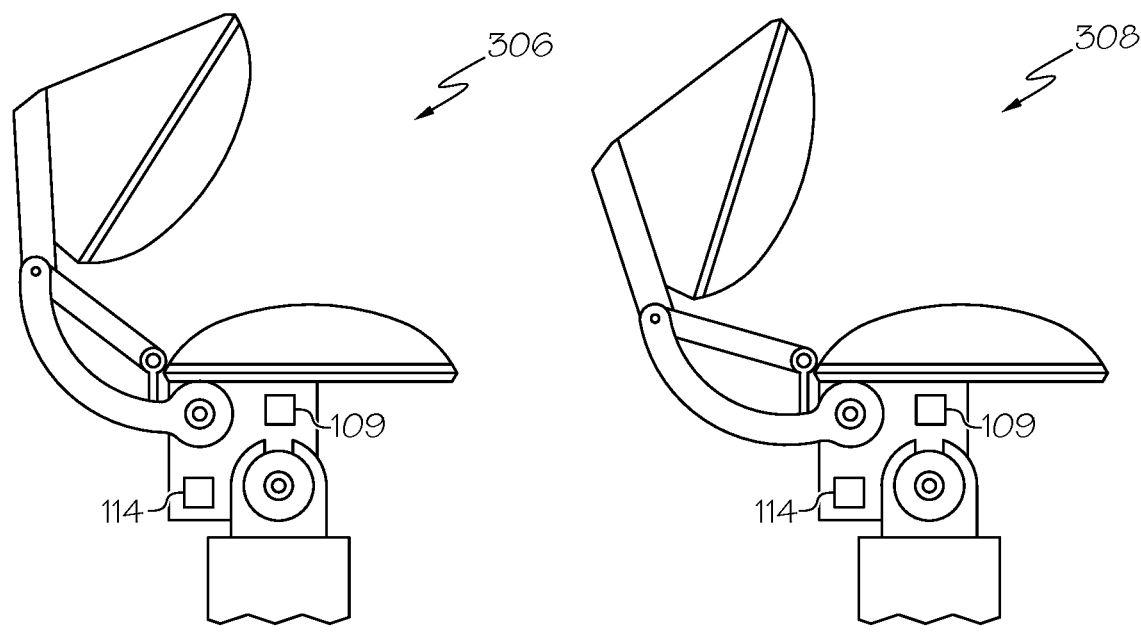

FIG. 3A depicts an example implementation of the robot end effector 102 in which the first deformable gripper 104 is positioned at various acute angles relative to the the second deformable gripper 106. In particular, as illustrated in FIG. 3A, orientation 302 corresponds to the first deformable gripper 104 and the second deformable gripper 106 defining an angle between the two grippers of fifteen degrees. Similarly, orientations 304, 306, and 308 correspond to the first deformable gripper 104 and the second deformable gripper 106 defining angles between the two grippers of thirty degrees, forty five degrees, and seventy degrees. It is noted that the first deformable gripper 104 and the second deformable gripper 106 may be oriented in a plurality of acute angles that differ from the angles of the orientations illustrated in FIG. 3A.

Figure 3B:
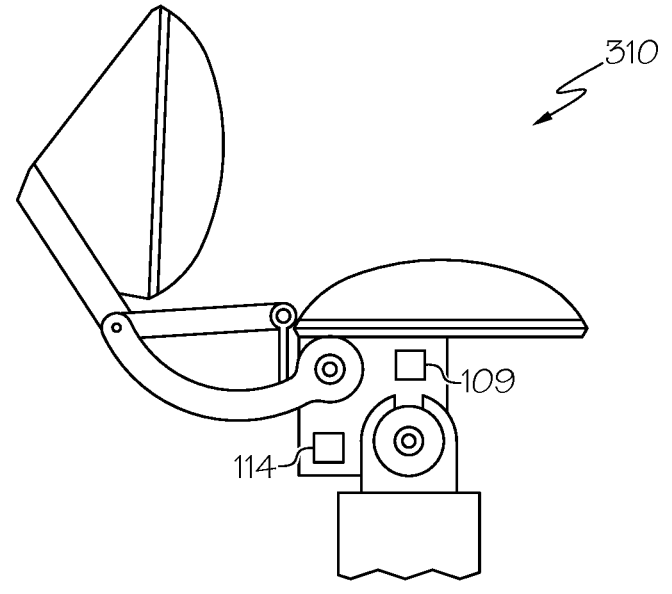
FIG. 3B depicts an example implementation of the robot end effector in which the first deformable gripper and the second deformable gripper are positioned at a ninety degree angle and an obtuse angle, according to one or more embodiments described and illustrated herein.
Figure 3B:
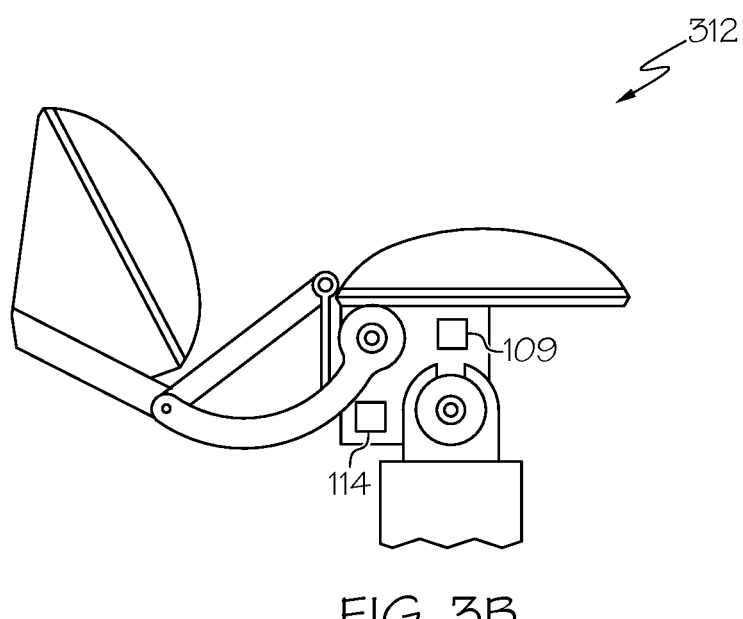

FIG. 3B depicts an example implementation of the robot end effector 102 in which the first deformable gripper 104 is positioned at an angle of ninety degrees relative to the second deformable gripper 106 and at an obtuse angle relative to the second deformable gripper 106. In particular, as illustrated in FIG. 3B, the orientations 310 and 312 correspond to the first deformable gripper 104 and the second deformable gripper 106 defining angles between the two grippers of ninety degrees and one hundred and twenty degrees, respectively.

Figure 4:
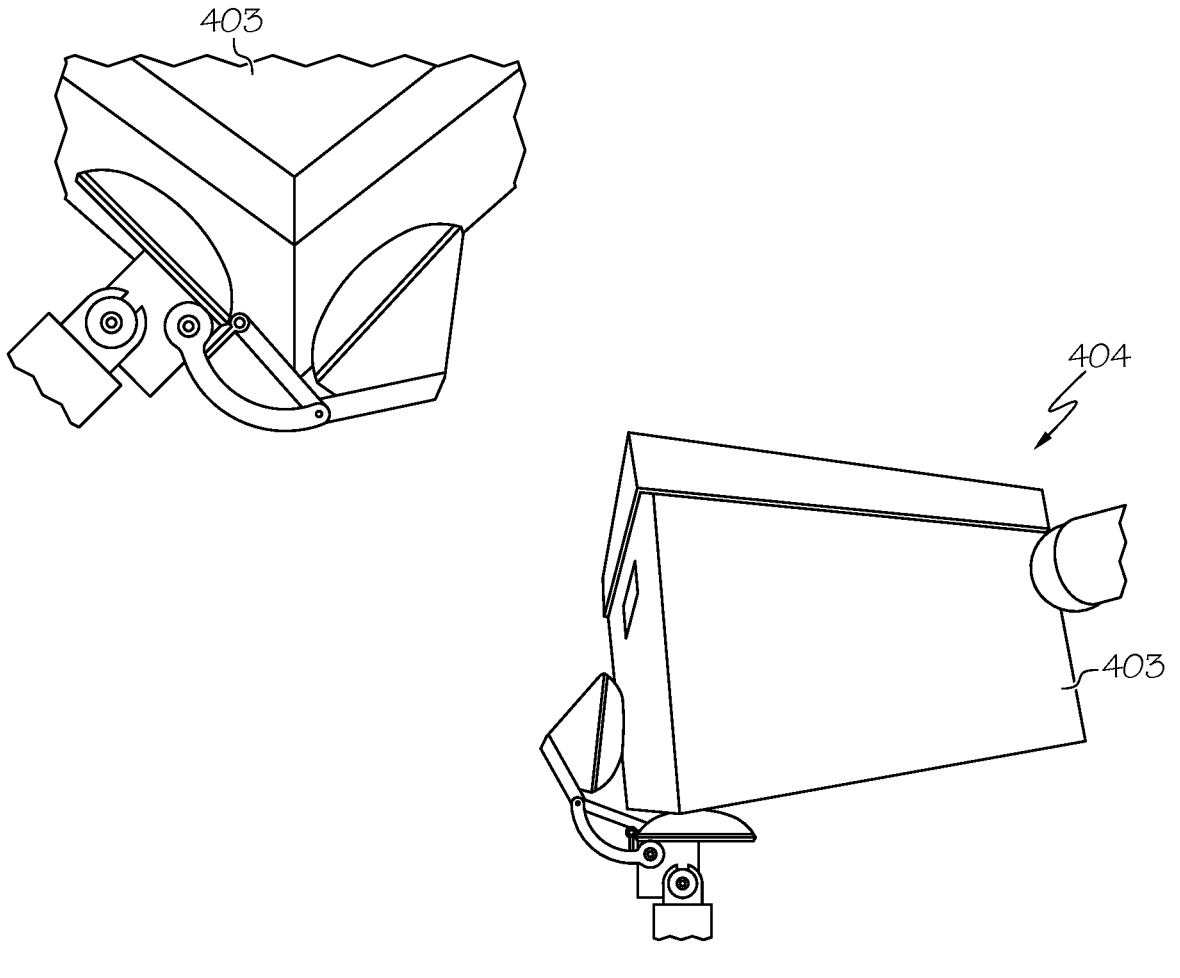
FIG. 4 depicts a plurality of example orientations of the robot end effector in which the first deformable gripper and the second deformable gripper interact with, grasp, and are configured to manipulate various objects having dimensions that significantly larger than the dimensions of the deformable grippers, according to one or more embodiments described and illustrated herein.
Figure 4:
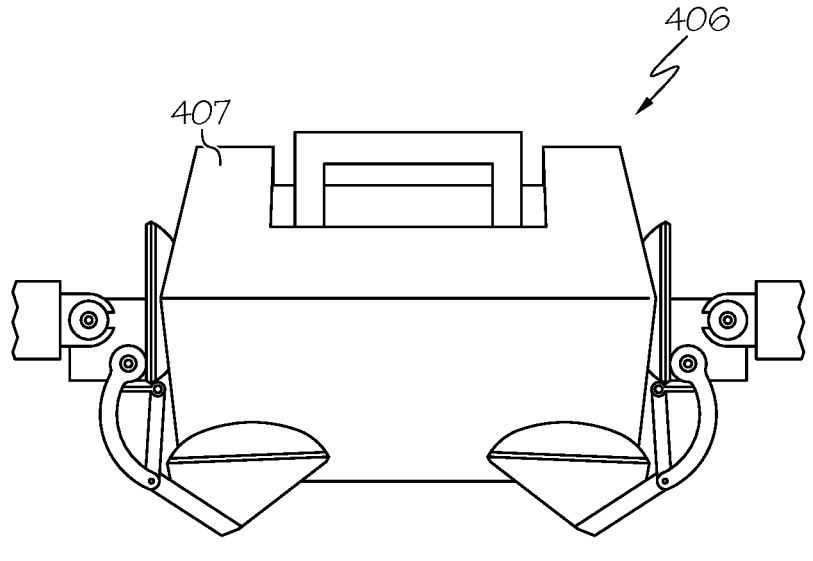

FIG. 4 depicts a plurality of example orientations of the robot end effector 102 in which the first deformable gripper 104 and the second deformable gripper 106 interact with, grasp, and are configured to manipulate various objects having dimensions that a significantly larger than the dimensions of the first deformable gripper 104 and the second deformable gripper 106, and the robot end effector 102. Regarding example orientation 402, the controller 114 may send instructions to the actuator 109, as a result of which the actuator 109 may operate to move the first deformable gripper 104 and the second deformable gripper 106 to a position or orientation defining an angle of approximately ninety degrees. In particular, as illustrated, the first deformable gripper 104 and the second deformable gripper 106 may be oriented around two sides of a particular corner of a box 403 that is disproportionately larger than the dimensions of the robot end effector 102 and the first deformable gripper 104 and the second deformable gripper 106. In operation, an example process for manipulating the box 403 may include an example orientation 404, as illustrated in FIG. 4, in which the first deformable gripper 104 may bear the weight of the box 403 while the second deformable gripper 106, positioned at an angle of ninety degrees relative to the first deformable gripper 104, may serve as a stabilization force to ensure that the position of the box 403 is maintained. Although FIG. 4 depicts two separate robot end effectors grasping the box 403 on opposite sides of the box 403, a single robot end effector may be utilized to manipulate and carry the box 403. In particular, the first deformable gripper 104 and the second deformable gripper 106 may be oriented at an angle such that both the grippers may serve as the base on which box 403 may be positioned. In other words, the box 403 may be tilted upwards at an angle of ninety degrees, with both of the grippers positioned at the base of the box 403. In other embodiments, in orientation 406, two robot end effectors are shown as being positioned around corners of a black container box 407 that is also disproportionately larger than each of the deformable grippers of the robot end effectors.

Figure 5:
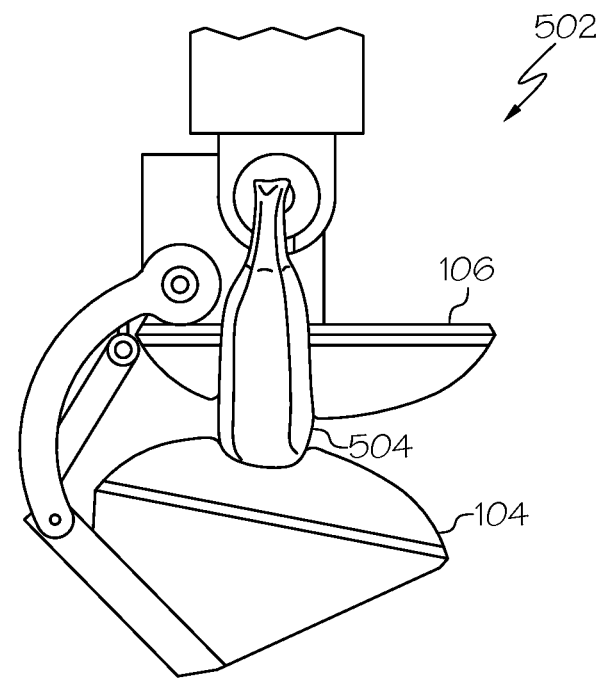
FIG. 5 depicts the robot end effector grasping and partially rotating an example external object, according to one or more embodiments described and illustrated herein.
Figure 5:
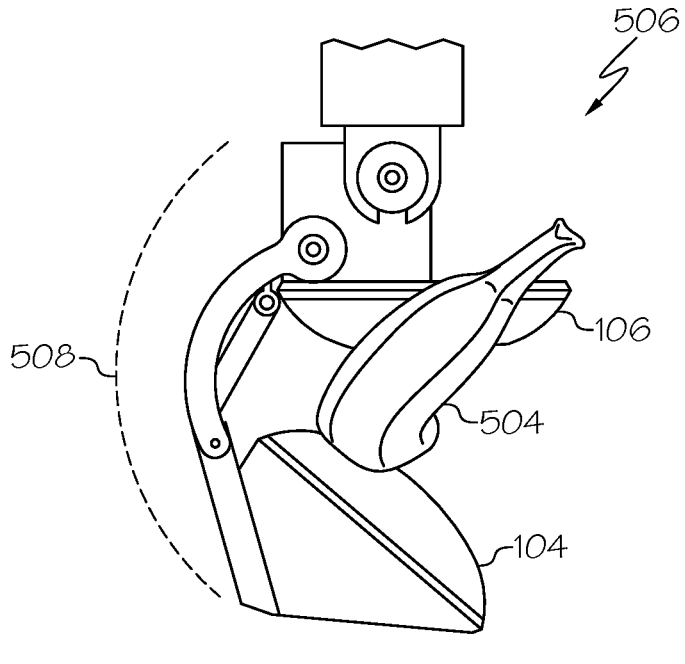

FIG. 5 depicts the robot end effector 102 grasping and rotating an example external object 504, according to one or more embodiments described and illustrated herein. In particular, an example orientation 502 shows the first deformable gripper 104 and the second deformable gripper 106 being moved to define an acute angle that corresponds to approximately ten degrees. It is noted that the first deformable gripper 104 and the second deformable gripper 106 may be positioned such that these grippers firmly grasp the outer surface of the example external object 504. In example orientation 506, each of the first deformable gripper 104 and the second deformable gripper 106 are shown as being partially rotated at an angle 508 of approximately twenty degrees. Additionally, the rotating motion of the robot end effector 102 is comparable to a typical rotating movement that may be performed by a wrist of a human being. Such a rotating motion enables the first deformable gripper 104 and the second deformable gripper 106 to grasp items located in areas where a robot may not be able to travel, e.g., around corners of walls, cabinets, and in gaps between walls in a home.

Figure 6:
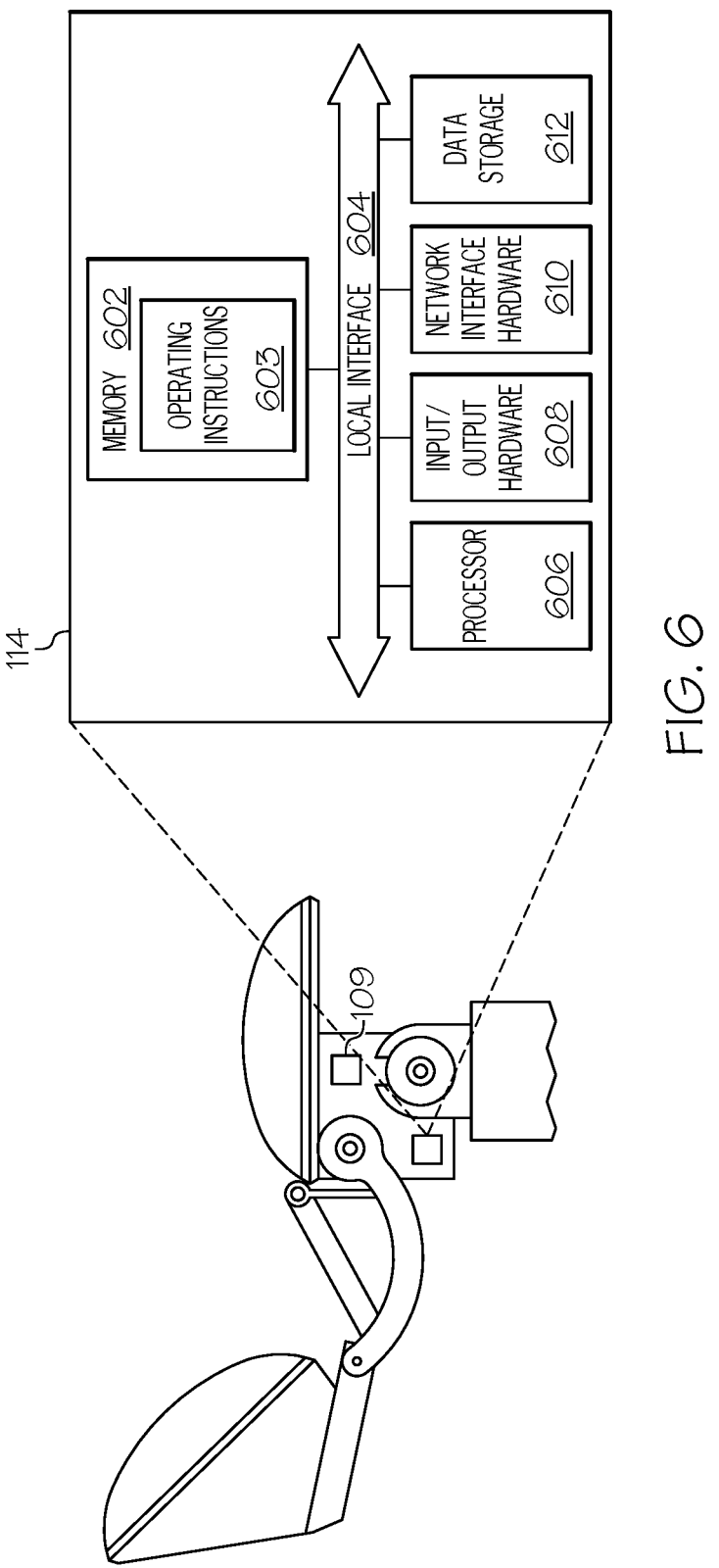
FIG. 6 depicts a non-limiting example of a controller that is configured to perform one or more of the features and functionalities described in the present disclosure, according to one or more embodiments described and illustrated herein.

FIG. 6 depicts a non-limiting example of the controller 114 that is configured to perform one or more of the features and functionalities described in the present disclosure, according to one or more embodiments described and illustrated herein. As illustrated, the controller 114 includes a processor 606, input/output hardware 608, a network interface hardware 610, a data storage component 612, and memory 602. The memory 602 may be configured as volatile and/or nonvolatile memory and as such, may include random access memory (including SRAM, DRAM, and/or other types of RAM), flash memory, secure digital (SD) memory, registers, compact discs (CD), digital versatile discs (DVD) (whether local or cloud-based), and/or other types of non-transitory computer-readable medium. Depending on the particular embodiment, these non-transitory computer-readable media may reside within the computing device and/or a device that is external to the controller 114.

The memory 602 may store operating instructions 603, each of which may be embodied as a computer program, firmware, and so forth. The memory 602 may comprise RAM, ROM, flash memories, hard drives, or any device capable of storing the operating instructions 603 such that the operating instructions 603 can be accessed by the processor 606. The operating instructions 603 may comprise logic or algorithm(s) written in any programming language of any generation (e.g., 1GL, 2GL, 3GL, 4GL, or 5GL) such as, for example, machine language that may be directly executed by the controller 114, or assembly language, object-oriented programming (OOP), scripting languages, microcode, etc., that may be compiled or assembled into machine readable and executable instructions and stored on the memory 602. Alternatively, the operating instructions 603 may be written in a hardware description language (HDL), such as logic implemented via either a field-programmable gate array (FPGA) configuration or an application-specific integrated circuit (ASIC), or their equivalents. Accordingly, the methods described herein may be implemented in any conventional computer programming language, as pre-programmed hardware elements, or as a combination of hardware and software components. The processor 606 along with the memory 602 may operate as a controller for the controller 114.

A local interface 604 is also included in FIG. 1 and may be implemented as a bus or other communication interface to facilitate communication among the components of the controller 114. The processor 606 may include any processing component operable to receive and execute operating instructions 603 from the memory 602 (such as from a data storage component 612 and/or the memory 602). Accordingly, the processor 606 may be an integrated circuit, a microchip, a computer, or any other computing device. As described above, the input/output hardware 608 may include and/or be configured to interface with speakers, microphones, and/or other input/output components.

The operating instructions 603 may include an operating system and/or other software for managing components of the controller 114. It should be understood that while the component in FIG. 1 are illustrated as residing within controller 118, this is merely an example. In some embodiments, one or more of the components may reside external to the controller 114 or within other devices. It should be understood that, while the controller 114 is illustrated as a single device, this is also merely an example. As an example, one or more of the functionalities and/or components described herein may be provided by the controller 114. Depending on the particular embodiments, any of these devices may have similar components as those depicted in FIG. 1. To this end, any of these devices may include instructions for performing the functionality described herein.

It should now be understood that the embodiments of the present disclosure are directed to robot end effectors. The robot end effectors comprise a first deformable gripper, a second deformable gripper coupled to the first deformable gripper by a linkage, and an actuator coupled to the linkage and operable to move at least one of the first deformable gripper and the second deformable gripper to a position defining an angle between the first deformable gripper and the second deformable gripper that is greater than or equal to 130 degrees. In other embodiments, the robot end effector comprises a first deformable gripper, a second deformable gripper coupled to the first deformable gripper by a linkage, and an actuator coupled to the linkage and operable to move at least one of the first deformable gripper and the second deformable gripper to: a fully open defining an angle between the first deformable gripper and the second deformable gripper that is greater than or equal to 130 degrees, and a half open position defining an additional angle between the first deformable gripper and the second deformable gripper that is approximately 90 degrees.

In a first aspect, a robot end effector comprises a first deformable gripper, a second deformable gripper coupled to the first deformable gripper by a linkage, and an actuator coupled to the linkage and operable to move at least one of the first deformable gripper and the second deformable gripper to a position defining an angle between the first deformable gripper and the second deformable gripper that is greater than or equal to 130 degrees.

In a second aspect, the robot end effector of the first aspect, wherein the linkage is a four-component linkage that includes a fixed link component, and a plurality movable link components.

In a third aspect, the robot end effector of the second aspect, wherein the linkage is composed of carbon filled nylon.

In a fourth aspect, the robot end effector of any of the first to the third aspects, wherein each of the first deformable gripper and the second deformable gripper include an acrylic base and a deformable surface disposed therein, the deformable surface is composed of latex.

In a fifth aspect, the robot end effector of the fourth aspect, wherein the deformable surface of each of the first deformable gripper and the second deformable gripper includes a pattern embedded thereupon.

In a sixth aspect, the robot end effector of the fifth aspect, further comprising a camera that is configured to capture one or more images of an object contacting the pattern embedded on the deformable surface of each of the first deformable gripper and the second deformable gripper.

In a seventh aspect, the robot end effector of the sixth aspect, wherein the camera is positioned on the acrylic base included in each of the first deformable gripper and the second deformable gripper.

In an eighth aspect, the robot end effector of any of the first to the fifth aspects, further comprising plastic bushings positioned in association with each of the linkage, the first deformable gripper, and the second deformable gripper.

In a ninth aspect, the robot end effector of any of the first to the eighth aspects, wherein the actuator is operable to move the first deformable gripper and the second deformable gripper to a fully open position, a half-open position, and a fully closed position.

In a tenth aspect, the robot end effector of the ninth aspect, wherein the fully open position corresponds to the position defining the angle between the first deformable gripper and the second deformable gripper that is greater than or equal to 130 degrees.

In an eleventh aspect, the robot end effector of the ninth aspect, wherein the half-open position corresponds to an additional position defining an additional angle between the first deformable gripper and the second deformable gripper that is approximately 90 degrees.

In a twelfth aspect, a robot end effector comprises a first deformable gripper, a second deformable gripper coupled to the first deformable gripper by a linkage, and an actuator coupled to the linkage and operable to move at least one of the first deformable gripper and the second deformable gripper to: a fully open defining an angle between the first deformable gripper and the second deformable gripper that is greater than or equal to 130 degrees, and a half open position defining an additional angle between the first deformable gripper and the second deformable gripper that is approximately 90 degrees.

In a thirteenth aspect, the robot end effector of the twelfth aspect, wherein the linkage is a four-component linkage that includes a fixed link component, and a plurality movable link components.

In a fourteenth aspect, the robot end effector of the thirteenth aspect, wherein the linkage is composed of carbon filled nylon.

In a fifteenth aspect, the robot end effector of any of the twelfth to the fourteenth aspects, wherein each of the first deformable gripper and the second deformable gripper include an acrylic base and a deformable surface disposed therein, the deformable surface is composed of latex.

In a sixteenth aspect, the robot end effector of the fifteenth aspect, wherein the deformable surface of each of the first deformable gripper and the second deformable gripper includes a pattern embedded thereupon.

In a seventeenth aspect, the robot end effector of the sixteenth aspect, further comprising a camera that is configured to capture one or more images of an object contacting the pattern embedded on the deformable surface of each of the first deformable gripper and the second deformable gripper.

In an eighteenth aspect, the robot end effector of the seventeenth aspect, wherein the camera is positioned on the acrylic base included in each of the first deformable gripper and the second deformable gripper.

In a nineteenth aspect, the robot end effector of any of the twelfth to the eighteenth aspects, further comprising plastic bushings positioned in association with each of the linkage, the first deformable gripper, and the second deformable gripper.

In a twentieth aspect, the robot end effector of any of the twelfth to the nineteenth aspect, wherein the actuator is operable to move the first deformable gripper and the second deformable gripper to a fully open position, half-open position, and fully closed position.

The terminology used herein is for the purpose of describing particular aspects only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof. The term "or a combination thereof" means a combination including at least one of the foregoing elements.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

The invention claimed is:

1. A robot end effector comprising:

a first deformable gripper;

a second deformable gripper coupled to the first deformable gripper by a linkage, wherein the second deformable gripper is positioned perpendicular to a fixed link component of the linkage; and an actuator coupled to the linkage and operable to move at least one of the first deformable gripper and the second deformable gripper to a position defining an angle between the first deformable gripper and the second deformable gripper that is greater than or equal to 130 degrees.

2. The robot end effector of claim 1, wherein the linkage is a four-component linkage that includes the fixed link component, a plurality of movable link components, and a plurality of revolving joints.

3. The robot end effector of claim 2, wherein the linkage is composed of carbon filled nylon.

4. The robot end effector of claim 1, wherein each of the first deformable gripper and the second deformable gripper include an acrylic base and a deformable surface disposed therein, the deformable surface is composed of latex.

5. The robot end effector of claim 4, wherein the deformable surface of each of the first deformable gripper and the second deformable gripper includes a pattern embedded thereupon.

6. The robot end effector of claim 1, wherein the actuator is operable to move the first deformable gripper and the second deformable gripper to a fully open position, a half-open position, and a fully closed position.

7. The robot end effector of claim 6, wherein the half-open position corresponds to an additional position defining an additional angle between the first deformable gripper and the second deformable gripper that is approximately 90 degrees.

8. The robot end effector of claim 1, further comprising:
a controller comprising:
  a memory unit, wherein the memory unit stores one or more operating instructions;
  a processor, wherein the processor receives and executes the one or more operating instructions,
  wherein the controller sends the one or more operating instructions to the actuator to operate the first deformable gripper.

9. The robot end effector of claim 1, wherein the controller determines one or more characteristics of an external object, where the one or more characteristics include one or more of a geometric shape of the external object, a position of the external object, and an orientation of the external object.

10. The robot end effector of claim 1, wherein the second deformable gripper is static to prevent independent of the second deformable gripper during operation.

11. A robot end effector comprising:
a first deformable gripper;
a second deformable gripper coupled to the first deformable gripper by a linkage, wherein the second deformable gripper is positioned perpendicular to a fixed link component of the linkage; and
an actuator coupled to the linkage and operable to move at least one of the first deformable gripper and the second deformable gripper to:

a fully open defining an angle between the first deformable gripper and the second deformable gripper that is greater than or equal to 130 degrees, and
a half open position defining an additional angle between the first deformable gripper and the second deformable gripper that is approximately 90 degrees.

12. The robot end effector of claim 11, wherein the linkage is a four-component linkage that includes the fixed link component, a plurality of movable link components, and a plurality of revolving joints.

13. The robot end effector of claim 12, wherein the linkage is composed of carbon filled nylon.

14. The robot end effector of claim 11, wherein each of the first deformable gripper and the second deformable gripper include an acrylic base and a deformable surface disposed therein, the deformable surface is composed of latex.

15. The robot end effector of claim 14, wherein the deformable surface of each of the first deformable gripper and the second deformable gripper includes a pattern embedded thereupon.

16. The robot end effector of claim 11, wherein the actuator is operable to move the first deformable gripper and the second deformable gripper to a fully open position, half-open position, and fully closed position.

17. The robot end effector of claim 11, further comprising:
a controller comprising:
  a memory unit, wherein the memory unit stores one or more operating instructions;
  a processor, wherein the processor receives and executes the one or more operating instructions,
  wherein the controller sends the one or more operating instructions to the actuator to operate the first deformable gripper.

18. The robot end effector of claim 11, wherein the controller determines one or more characteristics of an external object, where the one or more characteristics include one or more of a geometric shape of the external object, a position of the external object, and an orientation of the external object.

19. The robot end effector of claim 11, wherein the second deformable gripper is static to prevent independent of the second deformable gripper during operation.

* * * * *